US012292009B2

(12) United States Patent
Breidenstein et al.

(10) Patent No.: US 12,292,009 B2
(45) Date of Patent: May 6, 2025

(54) HIGH OXYGEN OPERATION OF INTERNAL COMBUSTION ENGINES

(71) Applicant: GAS TECHNOLOGIES LLC, Walloon Lake, MI (US)

(72) Inventors: Walter Breidenstein, Boyne Falls, MI (US); Ryan Anthony Garf, Grosse Ile, MI (US); Craig Alan Karavas, Trenton, MI (US); Robin Parsons, Georgetown, TX (US)

(73) Assignee: Gas Technologies LLC, Walloon Lake, MI (US)

( * ) Notice: Subject to any disclaimer, the term of this patent is extended or adjusted under 35 U.S.C. 154(b) by 0 days.

(21) Appl. No.: 18/276,561

(22) PCT Filed: Feb. 10, 2022

(86) PCT No.: PCT/US2022/016014

§ 371 (c)(1),
(2) Date: Aug. 9, 2023

(87) PCT Pub. No.: WO2022/173975

PCT Pub. Date: Aug. 18, 2022

(65) Prior Publication Data

US 2024/0110526 A1 Apr. 4, 2024

Related U.S. Application Data

(60) Provisional application No. 63/147,936, filed on Feb. 10, 2021.

(51) Int. Cl.
*F02M 21/02* (2006.01)
*F02D 19/06* (2006.01)

(52) U.S. Cl.
CPC ......... *F02D 19/066* (2013.01); *F02D 19/061* (2013.01); *F02D 19/0634* (2013.01)

(58) Field of Classification Search
CPC .. F02D 19/061; F02D 19/066; F02D 19/0634; C10L 1/10; C10L 1/18;
(Continued)

(56) References Cited

U.S. PATENT DOCUMENTS 6,508,209 B1 1/2003 Collier, Jr.
7,179,843 B2 2/2007 Bichkov et al.
(Continued)

OTHER PUBLICATIONS

Varadaraja Setty, B.E. , the Effect of Oxygen-Enriched Air on the Performance and Exhaust Emissions of Internal Combustion Engines , May 1993, a Thesis in Mechanical Engineering, Texas Tech University (Year: 1993).*
(Continued)

*Primary Examiner* — Long T Tran
*Assistant Examiner* — James J Kim
(74) *Attorney, Agent, or Firm* — Brooks Kushman P.C.

(57) ABSTRACT

A method for operating an internal combustion engine includes a step of providing an oxygen-containing gas having greater than 22 volume percent oxygen and combining the oxygen-containing gas with a fuel to form a combustible mixture. The combustible mixture is provided to an internal combustion engine wherein combustion of the combustible mixture drive the internal combustion engine. An internal combustion system executing the method is also provided.

26 Claims, 9 Drawing Sheets

(58) Field of Classification Search
CPC ...... C10L 1/125; C10L 1/1852; C10L 1/1857; C10L 1/1881; C10L 2270/02; C10L 2290/02; C10L 2290/24
USPC .......................................................... 123/525
See application file for complete search history.

(56) References Cited

U.S. PATENT DOCUMENTS

| | | | |
|---|---|---|---|
| 7,314,035 | B2 | 1/2008 | Akmandor et al. |
| 7,578,981 | B2 | 8/2009 | Pawlak et al. |
| 7,642,293 | B2 | 1/2010 | Pawlak et al. |
| 7,687,669 | B2 | 3/2010 | Pawlak et al. |
| 7,879,296 | B2 | 2/2011 | Pawlak et al. |
| 7,910,787 | B2 | 3/2011 | Pawlak et al. |
| 7,914,749 | B2 | 3/2011 | Carstens et al. |
| 7,947,155 | B1 | 5/2011 | Green et al. |
| 8,193,254 | B2 | 6/2012 | Pawlak et al. |
| 8,202,916 | B2 | 6/2012 | Pawlak et al. |
| 8,293,186 | B2 | 10/2012 | Pawlak et al. |
| 8,875,685 | B2 | 11/2014 | McNeil |
| 9,587,189 | B2 | 3/2017 | Gaffney et al. |
| 9,745,238 | B2 | 8/2017 | Gaffney et al. |
| 10,221,118 | B2 | 3/2019 | Gaffney et al. |
| 10,227,538 | B2 * | 3/2019 | Gaffney .................. C07C 51/00 |
| 10,287,224 | B2 | 5/2019 | Pawlak et al. |
| 10,322,397 | B2 | 6/2019 | Visser et al. |
| 10,590,357 | B2 | 3/2020 | Gaffney et al. |
| 10,975,011 | B2 | 4/2021 | Gaffney et al. |
| 10,995,685 | B2 | 5/2021 | Breidenstein et al. |
| 11,103,849 | B2 | 8/2021 | Visser et al. |
| 2004/0134696 | A1 | 7/2004 | Esposito Corcione et al. |
| 2008/0314018 | A1 | 12/2008 | Chander |
| 2009/0238059 | A1 | 11/2009 | Tewari et al. |
| 2014/0026853 | A1 | 1/2014 | Gray, Jr. et al. |
| 2015/0089862 | A1 * | 4/2015 | Gaffney .................... C10L 1/18 44/444 |
| 2017/0081602 | A1 | 3/2017 | Gaffney et al. |

OTHER PUBLICATIONS

R.R. Sekar et al., Experimental Evaluation of Oxygen-Enriched Air and Emulsified Fuels in a Single-Cylinder Diesel Engine, Nov. 1991 (Year: 1991).*

ISR and Written Opinion mailed Jun. 28, 2022 for PCT Appn. No. PCT/US22/16014, 17 pgs.

* cited by examiner

HIGH OXYGEN OPERATION OF INTERNAL COMBUSTION ENGINES

CROSS-REFERENCE TO RELATED APPLICATIONS

This application is the U.S. national phase of PCT Appln. No. PCT/US2022/016014 filed Feb. 10, 2022, which claims the benefit of U.S. provisional application Ser. No. 63/147,936 filed Feb. 10, 2021, the disclosure of which is hereby incorporated in its entirety by reference herein.

TECHNICAL FIELD

In at least one aspect, the present invention is related to method of operating an internal combustion engine with nontraditional oxygenated fuels including but not limited to methanol, ethanol, butanol, propanol, dimethyl ether, and other oxygen containing gases and water

SUMMARY

In at least one aspect, a method for operating an internal combustion engine is provided. The method includes a step of providing an oxygen-containing gas having greater than 22 volume percent oxygen and combining the oxygen-containing gas with a fuel to form a combustible mixture. The combustible mixture is provided to an internal combustion engine wherein combustion of the combustible mixture drives the internal combustion engine.

In another aspect, the method includes a step of oxygen-enriching ambient air to form the oxygen-containing gas.

In another aspect, an internal combustion system executing the method set forth herein in also provided. The internal combustion system includes an internal combustion engine and a source of an oxygen-containing gas having at least 22 volume percent oxygen. The internal combustion engine system also includes a fuel injection system with a chamber for combining the oxygen-containing gas with an alternative fuel to form a combustible mixture. A conduit that provides the combustible mixture to the internal combustion engine. A control system that controls the ratio of oxygen-containing gas to fuel.

In another aspect, a kit for upgrading a vehicle having an internal combustion engine to use an alternative fuel is provided. The kit system includes an oxygen storage container that provides an oxygen-containing gas having at least 22 volume percent oxygen and a fuel injection system that includes injectors, rail, control valves, vaporizer/regulator, control ECU, ECU electrical harness, hoses, tubing and installation hardware, fuel storage container and a mixing chamber for combining the oxygen-containing gas with the alternative fuel to form a combustible mixture. The fuel injection system is configured to replace or supplement a vehicle's existing OEM fuel injection system. The kit may also include a conduit that is adapted to connect the fuel injection system to the internal combustion engine and a generator adapted to be operated by the internal combustion engine to produce electricity for battery charging. The kit can also include a battery for providing power to a vehicle drive train. The kit may also include electric drive motor(s) as required for optional electric propulsion of the vehicle.

In another aspect, an internal combustion engine is operated with the alternative fuels set forth herein. The engine runs an generator that is used to charge one or more batteries. The batteries are used to power electric motor that are used to propel a vehicle.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

For a further understanding of the nature, objects, and advantages of the present disclosure, reference should be had to the following detailed description, read in conjunction with the following drawings, wherein like reference numerals denote like elements and wherein.

DETAILED DESCRIPTION

Figure 1:
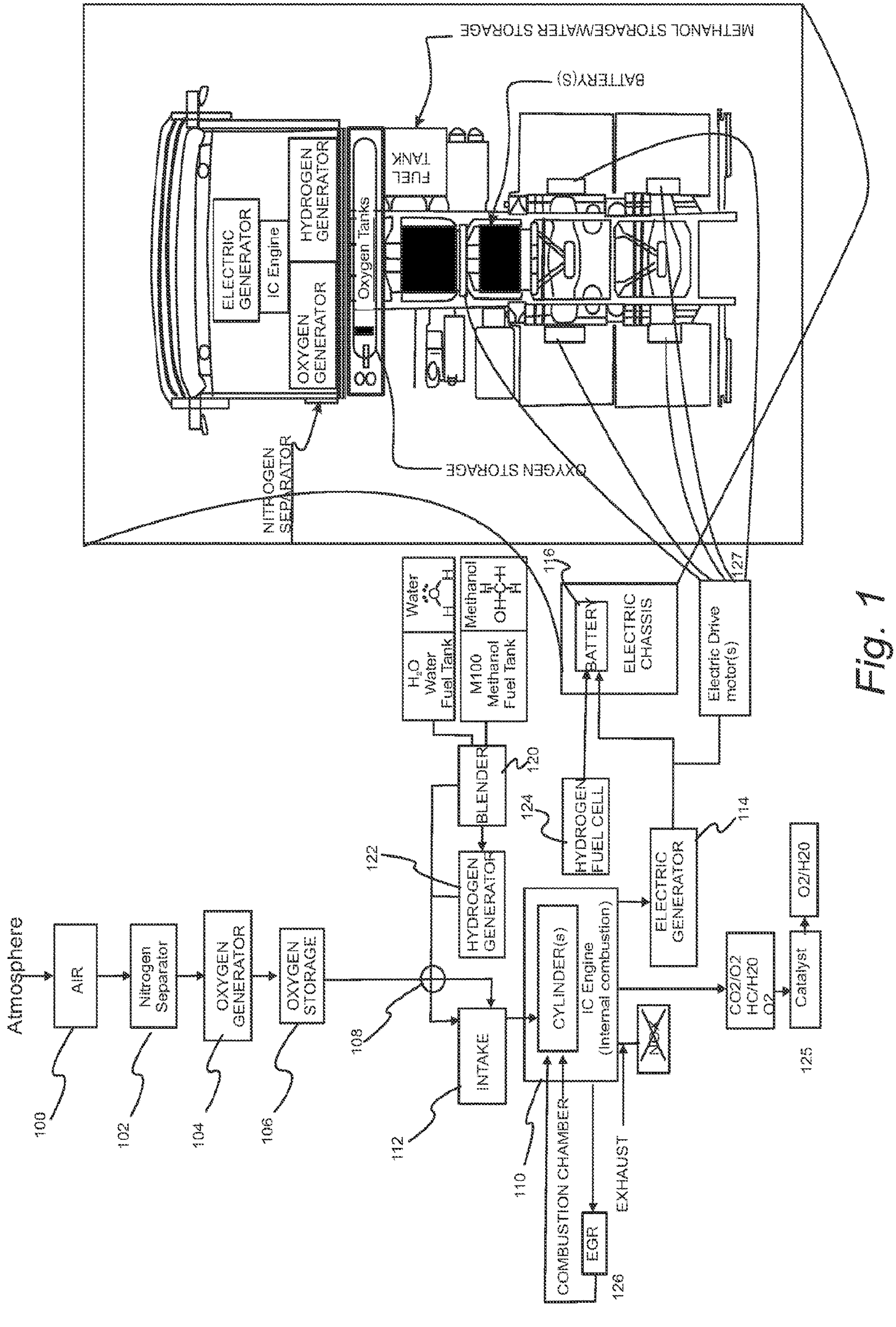
FIG. 1. Flow chart depicting the operation of an internal combustion engine by increasing the oxygen concentration in ambient air, through the addition of either stored free oxygen or oxygenated fuels.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "about" means that the amount or value in question may be the specific value designated or some other value in its neighborhood. Generally, the term "about" denoting a certain value is intended to denote a range within +/−5% of the value. As one example, the phrase "about 100" denotes a range of 100+/−5, i.e. the range from 95 to 105. Generally, when the term "about" is used, it can be expected that similar results or effects according to the invention can be obtained within a range of +/−5% of the indicated value.

As used herein, the term "and/or" means that either all or only one of the elements of said group may be present. For example, "A and/or B" shall mean "only A, or only B, or both A and B". In the case of "only A", the term also covers the possibility that B is absent, i.e. "only A, but not B".

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The phrase "composed of" means "including" or "consisting of." Typically, this phrase is used to denote that an object is formed from a material.

With respect to the terms "comprising," "consisting of," and "consisting essentially of," where one of these three terms is used herein, the presently disclosed and claimed subject matter can include the use of either of the other two terms.

The term "one or more" means "at least one" and the term "at least one" means "one or more." The terms "one or more" and "at least one" include "plurality" as a subset.

The term "substantially," "generally," or "about" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

When referring to a numeral quantity, in a refinement, the term "less than" includes a lower non-included limit that is 5 percent of the number indicated after "less than." For example, "less than 20" includes a lower non-included limit of 1 in a refinement. Therefore, this refinement of "less than 20" includes a range between 1 and 20. In another refinement, the term "less than" includes a lower non-included limit that is, in increasing order of preference, 20 percent, 10 percent, 5 percent, or 1 percent of the number indicated after "less than."

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

The term "alternative fuel" means a fuel other than gasoline or diesel. In a refinement, the alternative fuel can be a renewable fuel.

Throughout this application, where publications are referenced, the disclosures of these publications in their entireties are hereby incorporated by reference into this application to more fully describe the state of the art to which this invention pertains.

Abbreviations:

"IC" means internal combustion.

"EGR" means exhaust gas recirculation.

Referring to FIG. 1, a flow chart illustrating the operation of an internal combustion engine using ambient is provided. As depicted in Boxes 100-104, an oxygen-containing gas having an oxygen concentration greater than 22 volume percent is produce by enriching the amount of oxygen in air. In a variation, the oxygen-containing gas is generated onboard from ambient air as follows. In Box 100, ambient air is drawn into the combustion system. The air is passed through a nitrogen separator (Box 102). This results in the generation of oxygen whereby the concentration of oxygen is increased to a value greater than 22 volume % oxygen (Box 104). In one refinement, the oxygen in the oxygen-containing gas is from 30 volume % to 100 volume %. In another refinement, the concentration of oxygen in the oxygen-containing gas from 50 volume % to 90 volume %. In some refinements, the concentration of oxygen in the oxygen-containing gas is greater than, in increasing order of preference, 22 volume %, 25 volume %, 30 volume %, 35 volume %, 50 volume %, or 70 volume % and less than, in increasing order of preference, 75 volume %, 80 volume %, 90 volume %, or 100 volume %.

The highly oxygen enriched air is then optionally stored in a container/buffer tank (Box 106). As indicated by circles 108, the oxygen-enriched air is combined with a fuel to form a combustible mixture. In a refinement, the fuel can include a component selected from the group consisting of methanol, ethanol, water, diesel fuel, gasoline, and combinations thereof. In one refinement, the alternative fuel is methanol or a combination of water and methanol. In another refinement, the alternative fuel is methanol or a combination of water and methanol and provides form processes that convert hydrocarbons into alcohols and other oxygenates. Examples of compositions that can be used as fuels in the methods herein are found in U.S. Pat. Nos. 11,103,849; 10,995,685; 10,975,011; 10,590,357; 10,322,397; 10,287,224; 10,221,118; 9,745,238; 9,587,189; 8,293,186; 8,202,916; 8,193,254; 7,947,155; 7,914,749; 7,910,787; 7,879,296; 7,687,669; 7,642,293; 7,578,981; and 7,179,843.

In further refinements, the fuel includes methanol in an amount greater than, in increasing order of preference, 50 volume %, 60 volume %, 70 volume %, 80 volume %, 90 volume %, or 99 volume %. In still further refinements, the fuel includes methanol in an amount less than, in increasing order of preference, 100 volume %, 90 volume %, 80 volume %, 70 volume %, 60 volume %, or 55 volume %. In still further refinements, the fuel includes water in an amount at greater than, in increasing order of preference, 40 volume %, 30 volume %, 20 volume %, 10 volume %, 5 volume %, or 1 volume %, water. In still further refinements, the fuel includes water in an amount less than 50 volume %, 40 volume %, 30 volume %, 20 volume %, 10 volume %, or 5 volume %.

In another variation, the fuel is a combination of gasoline and an alcohol (e.g., ethanol and/or methanol). In one refinement, the fuel includes 50 to 100 volume % methanol. In other refinements, the fuel includes methanol in an amount greater than, in increasing order of preference, 5 volume %, 10 volume %, 20 volume %, 30 volume %, 40 volume %, 50 volume %, or 60 volume %. In still further refinements, the fuel includes methanol in an amount less than, in increasing order of preference, 100 volume %, 90 volume %, 80 volume %, 70 volume %, 60 volume %, or 55 volume %. In still further refinements, the fuel includes gasoline in an amount at greater than, in increasing order of preference, 1 volume %, 10 volume %, 20 volume %, 30 volume %, 40 volume %, 50 volume %, or 60 volume %. In still further refinements, the fuel includes gasoline in an amount less than 98 volume %, 90 volume %, 80 volume %, 70 volume %, 50 volume %, 30 volume %, 10 volume %, or 5 volume %.

The combustible mixture can be directly provided to internal combustion engine 110. In a variation, the combination of oxygen-enriched air and fuel is provide to internal combustion engine 110 via intake manifold 112. In this variation, the oxygen generation is "on-board" meaning that the ambient air is in fluid communication with the internal combustion engine. In a refinement, the internal combustion engine 110 operates with the otto cycle. In another refinement, the internal combustion engine 110 operates with the diesel cycle.

In some variations, the internal combustion engine provides enhanced compression of liquids or gases.

In some variations, internal combustion engine is configured to operate for direct or indirect propulsion of an on or off road vehicle, direct or indirect propulsion of marine vessels, power generation, or industrial and agricultural pumping.

In a variation, internal combustion engine 110 is used to drive electrical generator 114 which is used to charge battery 116 for storage of energy to be used for electrical propulsion.

In some circumstances, an existing engine may be to be adapted to run on the fuels set forth herein. U.S. Pat. No. 7,349,790 provides a method for operating a flex fuel conversion system that allows an engine to be operated on gasoline, ethanol or any combination of gasoline and ethanol.

Still referring to FIG. 1, water and methanol can be combined in a blender 120 to produce the fuel that is provided to the internal combustion engine. In a variation this fuel can also be provided to hydrogen generator 122. In a refinement, the hydrogen produced from hydrogen generator 122 is provided to hydrogen fuel cell 124 which can be used to charge battery 116. Exhaust gas may be recycled through the EGR valve 126 (either cooled or non-cooled) to improve both efficiency of energy production and reduction in fuel consumption by using the exhaust gas as a working media in the absence of the free nitrogen normally used as the working medium in a typical atmosphere induction engine. In general, the EGR valve 126 recirculates a portion of the exhaust gas to the engine intake system 112 for increased engine efficiency, reduced fuel consumption and lower NOx emissions. Potential harmful emissions ($CO_2$, CO and HC) which can be created with the heat and pressure of combustion throughout transient cycles with rapid changes in load can be reduced to nonharmful constituents of water ($H_2$) and oxygen ($O_2$) through the catalytic reformation of the molecules in the exhaust stream whilst passing through the catalytic converter 125.

FIG. 1 also provides an inset illustrating that the system can be mounted on a vehicle 130. The system may be used either for the direct propulsion of the vehicle, hybrid propulsion via electric motor(s) 127 powered by the energy stored in the batteries, or both. Electric drive motor(s) may be centrally located on the output of the drive shaft, for single point electric propulsion, or at each wheel or axle for decentralized/multipoint/point of use propulsion.

Figure 2:
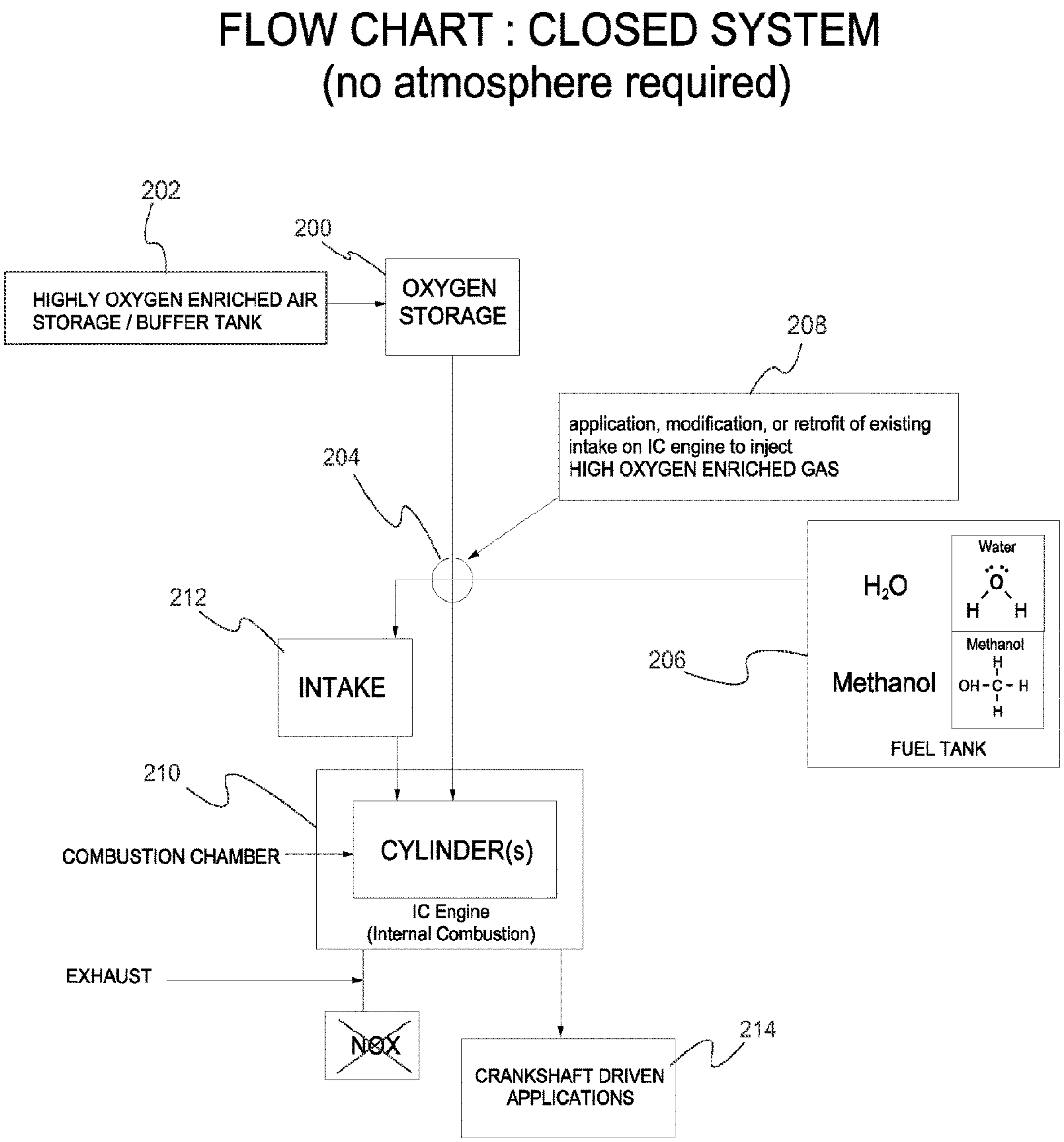
FIG. 2. Flow chart depicting the operation of an internal combustion engine using an oxygen source and not ambient air.

Referring to FIG. 2, a flow chart illustrating the operation of an internal combustion engine not using ambient air is provided. In a variation, the system describe is a closed system in the sense that the oxygen-containing gas is provided from a storage tank and not generated onboard. In this regard, oxygen source 200 can provide an oxygen-containing gas from an air storage/buffer tank 202. Typically, the oxygen-containing gas is highly oxygen enriched air. In some refinements, the concentration of oxygen in the oxygen-containing gas is greater than, in increasing order of preference, 22 volume %, 25 volume %, 30 volume %, 35 volume %, 50 volume %, or 70 volume % and less than, in increasing order of preference, 75 volume %, 80 volume %, 90 volume %, or 100 volume %.

As indicated by circles 204, the oxygen-enriched air is combined with a fuel provided from fuel source 206 to form a combustible mixture. In a refinement, the fuel can include a component selected from the group consisting of methanol, ethanol, gasoline, and combinations thereof. In one refinement, the fuel is methanol or a combination of water and methanol. In further refinements, the fuel includes methanol in an amount greater than, in increasing order of preference, 50 volume %, 60 volume %, 70 volume %, 80 volume %, 90 volume %, or 99 volume %. In still further refinements, the fuel includes methanol in an amount less than, in increasing order of preference, 100 volume %, 90 volume %, 80 volume %, 70 volume %, 60 volume %, or 55 volume %. In still further refinements, the fuel includes water in an amount at greater than, in increasing order of preference, 40 volume %, 30 volume %, 20 volume %, 10 volume %, 5 volume %, or 1 volume %. In still further refinements, the fuel includes water in an amount less than 50 volume %, 40 volume %, 30 volume %, 20 volume %, 10 volume %, or 5 volume %. A carbon intensity reduction device can contribute to net zero emissions. In this regard, carbon intensity and heat management system contributes to net zero emissions in combination fuel sources, system and method reduces carbon intensity. Highly oxygen rich air creates heat and we need to reduce heat to do this we are adding low BTU alcohol reactions with highly oxygen enriched air.

As indicated in Box 208, a method for operating a conversion system includes an aftermarket fuel delivery system that allows an engine to be operated on a closed atmosphere of oxygen and methanol and/or another alternative fuel or any combination thereof.

Figure 3:
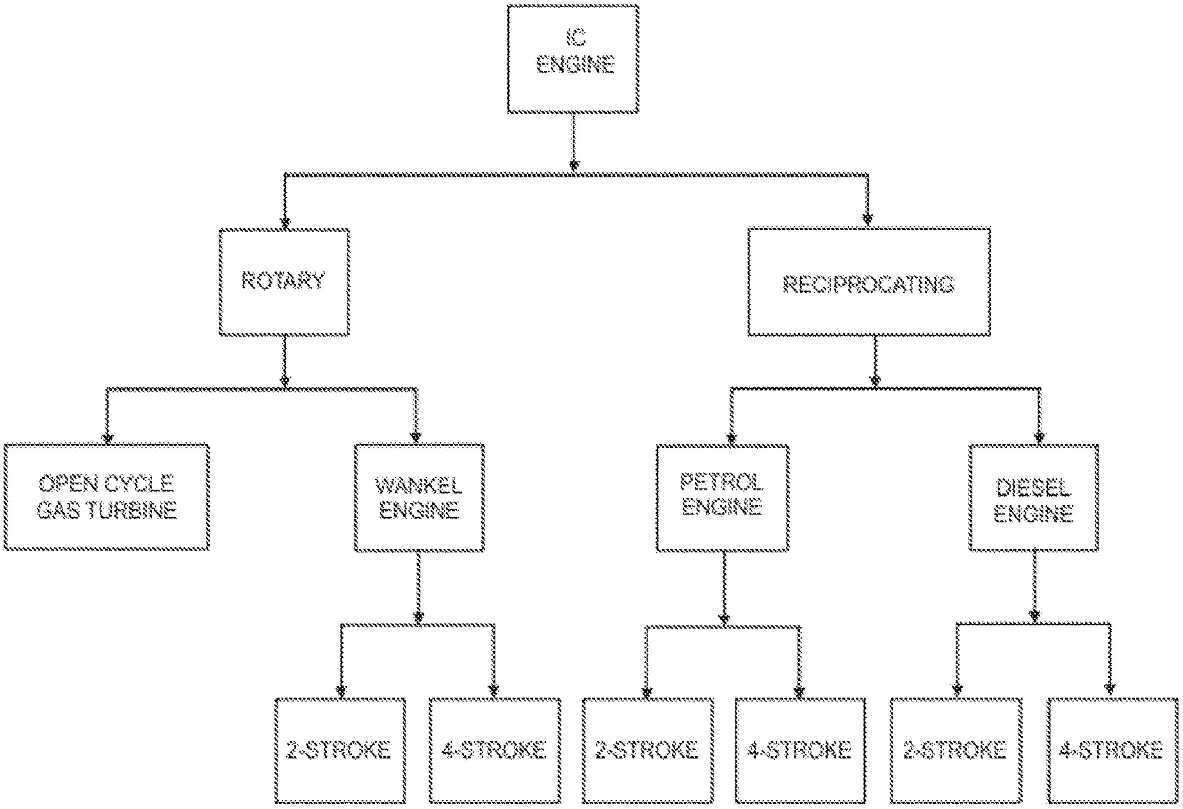
FIG. 3. Chart showing various types of IC engines that can apply the method using oxygen-enriched air.

The combustible mixture can be directed provided to internal combustion engine 210. In certain variations, the combination of oxygen-enriched air and fuel is provided to an internal combustion engine 210 via intake manifold 212. In a variation, an internal combustion engine 210 is used to power any number of crank shaft applications 214. FIG. 3 provides a chart showing various types of IC engines that can apply the method using oxygen-enriched air.

Figure 4:
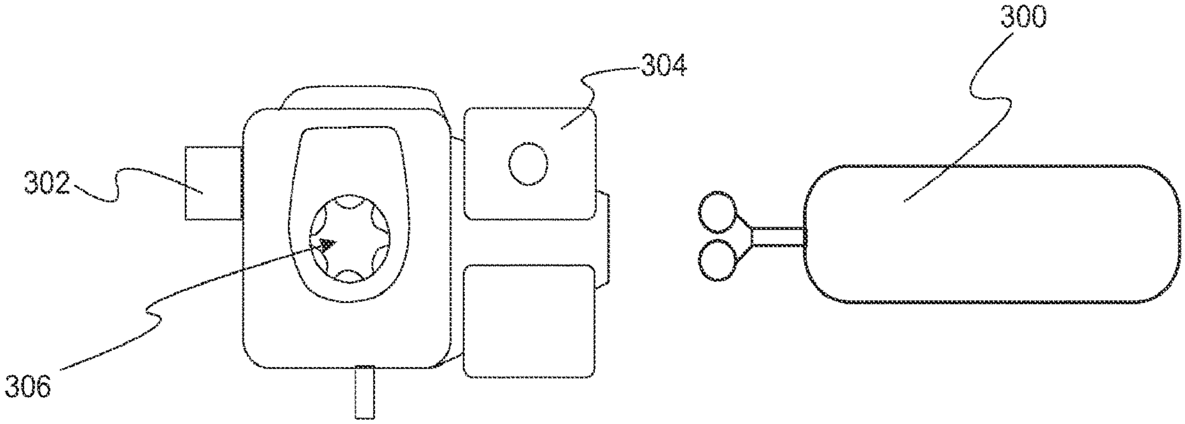
FIG. 4. Schematic of an IC engine with an adapter (e.g., venturi, draft tube, injector) to accept an oxygen-enriched gas.

FIG. 4 provides an illustration of a modification of the intake of a small carborated IC engine in order to implement the methods set forth above. The modifications include oxygen injection, a delivery system, and a regulator in communication with oxygen storage (stored in either gaseous or liquified form) tank 300. Internal combustion engine 302 is fitted with an adapter 304 that can be used to modify or retrofit existing engines. Methanol in fuel tank 306 is also depicted in FIG. 4. Advantageously, this allows the IC engine to operate without an atmospheric air supply. Moreover, this modification/retrofit offers a variety of applications such as running underwater or in outer space which there is insufficient air supply to operate under standard IC engine conditions.

Figure 5:
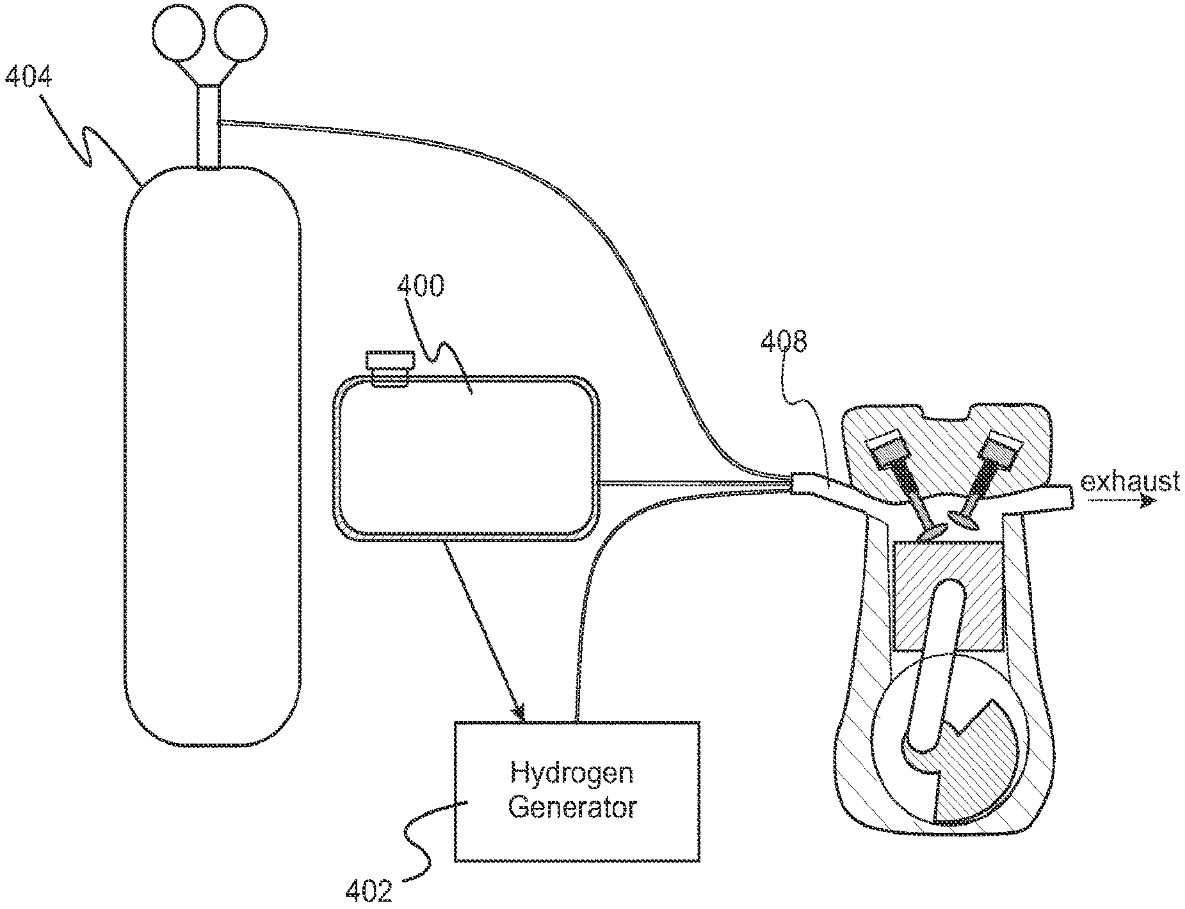
FIG. 5. Schematic illustrations of a four stroke IC engine operating via the methods using an oxygen-enriched gas.
Figure 6:
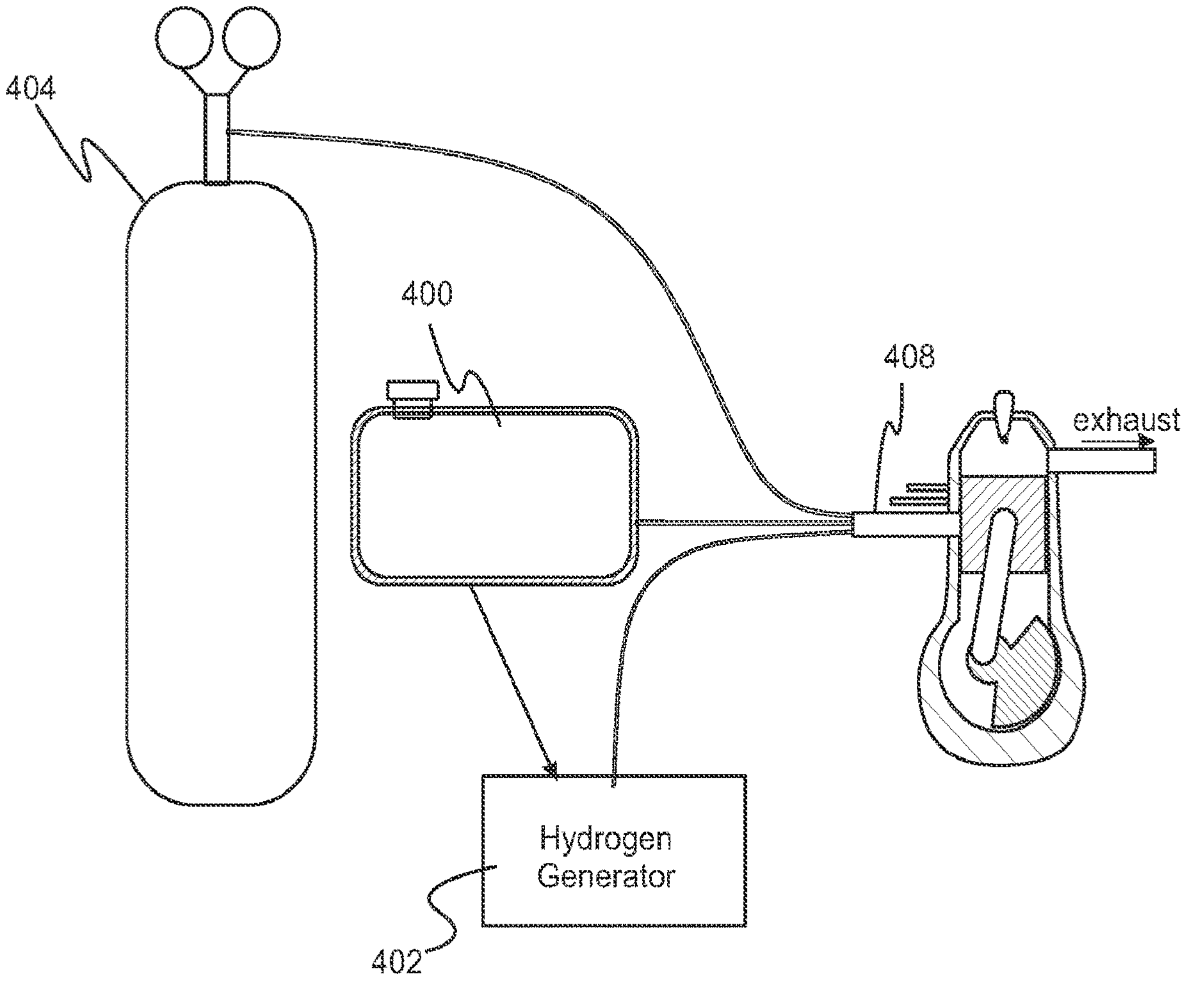
FIG. 6. Schematic illustrations of a two stroke IC engine operating via the methods using an oxygen-enriched gas.

FIGS. 5 and 6 provide schematic illustrations of IC engines operating via the methods set forth above. In this example, methanol from fuel source 400 is provided to hydrogen generator 402. The hydrogen from the hydrogen generator 402 is combined with methanol from fuel source 400 and with the oxygen-containing gas (enrich $O_2$ content as above) from oxygen source 404 to form a combustible mixture. The combustible mixture is effectively mixed in a mixing chamber 406 in communication with intake 408 of IC engine 410. FIG. 5 depicts a variation where IC engine 410 is a four stroke engine while FIG. 6 depicts a variation in which IC engine 410 is a two stroke engine.

Figure 7:
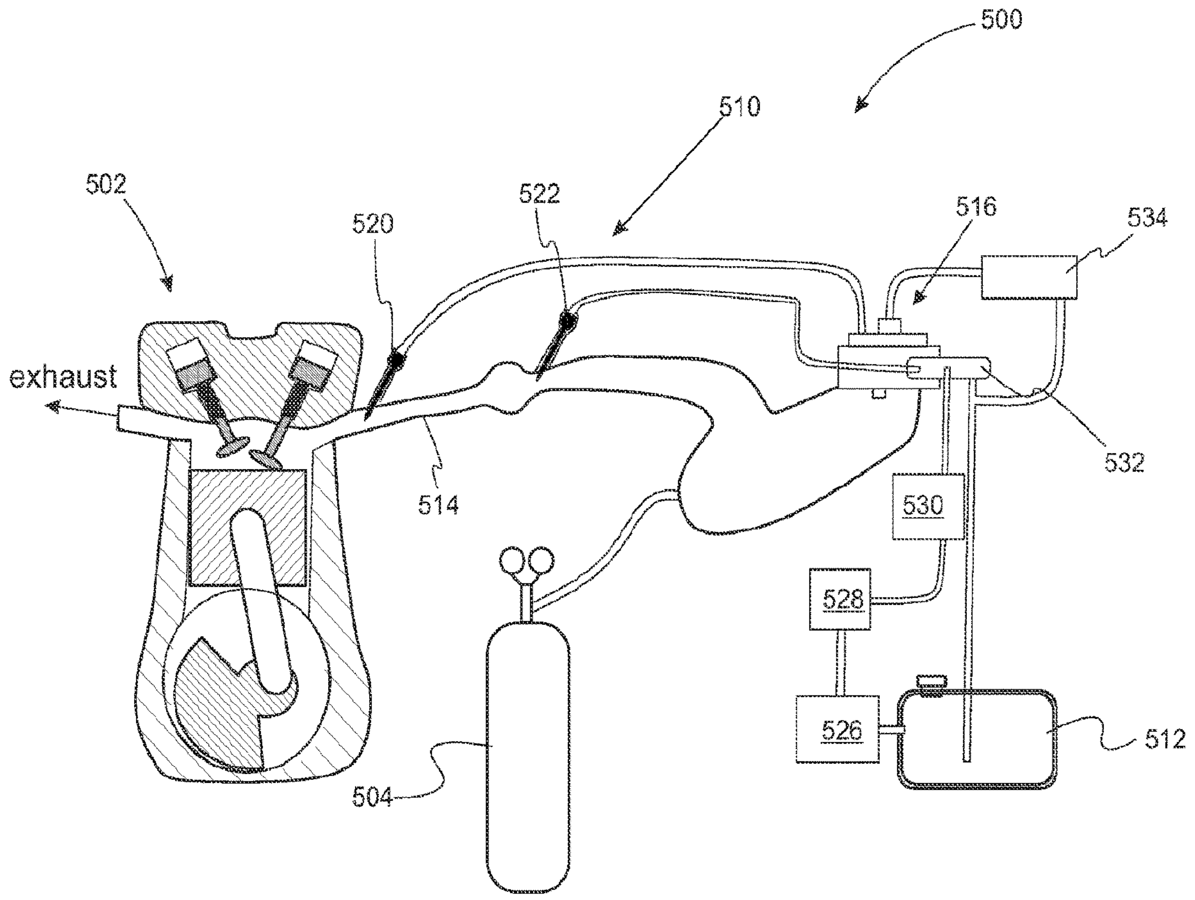
FIG. 7. Schematic illustration of a mechanical fuel injection system implementation using the method using an oxygen-enriched gas.
Figure 8:
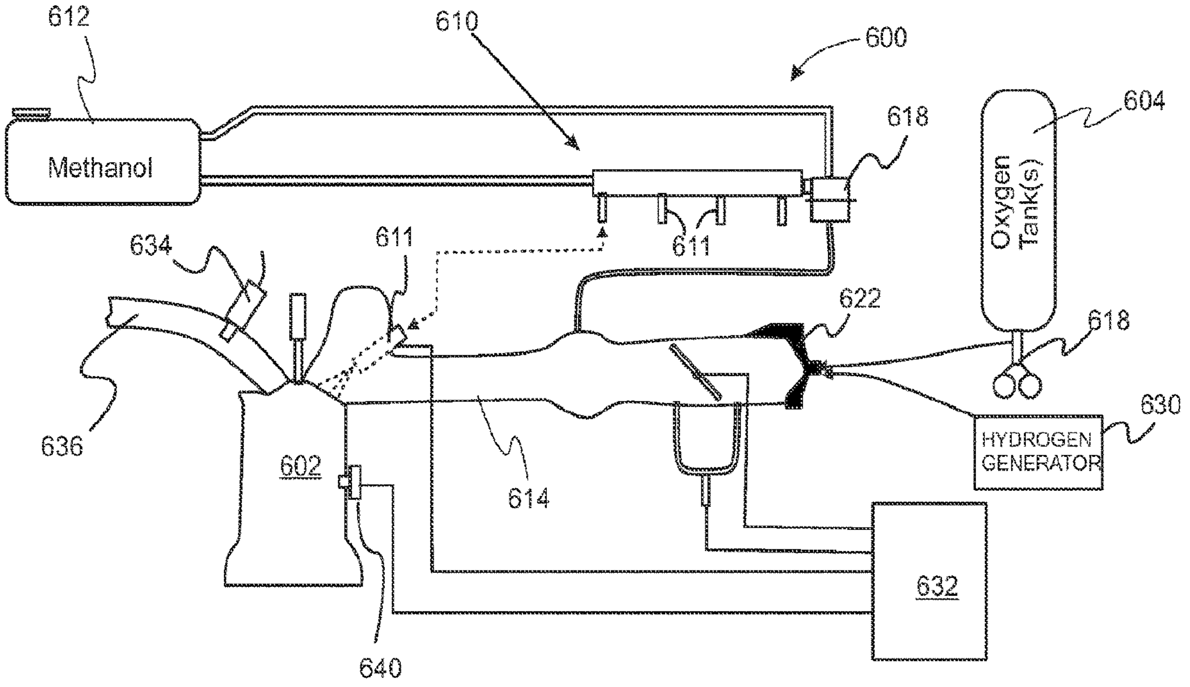
FIG. 8. Schematic illustration of an electronic fuel injection system implementation using the method using an oxygen-enriched gas.

FIGS. 7 and 8 provide schematic illustrations of IC engine systems with variation fuel injection systems. FIG. 7 provides a schematic illustration of in which the fuel injection system is a mechanical fuel injection system implement the method using an oxygen-enriched gas. Internal combustion system 500 executes the method set forth herein. The internal combustion system 500 includes an internal combustion engine 502 and a source of an oxygen-containing gas 504 having at least 22 volume percent oxygen. The internal combustion engine system also includes a fuel injection system 510 with a chamber for combining the oxygen-containing gas with an alternative fuel from fuel source 512 to form a combustible mixture. A conduit 514 provides the combustible mixture to the internal combustion engine 502. A control system 516 that controls the ratio of oxygen-containing gas to fuel. Fuel injection system 510 includes fuel injector 520 and cold start injection 522. In some refinement, the mechanical fuel injection system operates with single point injection, direct injection, port injection or upper intake stream induction. In the variation depicted, fuel from fuel is provide to the engine through the action of fuel pump 526 through fuel accumulator 528 and through fuel filter 530. The controller system 516 as depicted is fuel distributor and mixture controller. System 500 can also include a pressure regulator 532 and a fuel warmup regulator 534.

FIG. 8 provides a schematic illustration of an electronic fuel injection system implement the method using an oxygen-enriched gas. Internal combustion system 600 executes the method set forth herein. The internal combustion system 600 includes an internal combustion engine 602 and a source of an oxygen-containing gas 604 having at least 22 volume percent oxygen. The internal combustion engine system also includes a fuel injection system 610 having fuel injectors 611 Internal combustion system 600 can include chamber for combining the oxygen-containing gas with an alternative fuel from fuel source 612 to form a combustible mixture. A conduit 614 provides the combustible mixture to the internal combustion engine 602. Controlled injection of oxygen from reservoir 604 through oxygen pressure regulator 618 and intake modification retrofit 622 for introducing oxygen into the intake manifold an optionally hydrogen from hydrogen generator 630. In some refinements, the electronic fuel injection system 610 operates with single point injection, direct injection, port injection or upper intake stream induction. Fuel and oxygen injection are controlled by electronic control unit 632. Oxygen sensor 634 in engine exhaust 636 and coolant sensor 640 are also depicted.

It should be appreciated the methods set forth above can be operated between the extremes of a combustible mixture having 1 volume % oxygen and 99 volume % methanol, ethanol and water and a combustible mixture having 99 volume % oxygen and 1 volume % methanol, ethanol and water. The carbon intensity and heat management system contribute to near net zero emissions. The combination of the fuel sources, system, and methods set forth above reduce carbon intensity. High oxygen enriched air generates heat that may need to be reduced. Such reduction can be achieved by using low BTU alcohol ratios or a combination of low BTU alcohol and water ratios.

Advantageously, the methods and system set forth above have low or zero net emissions (of noxious gases) with a very low or zero NOx emission in particular. In some refinements, the NOx emissions are less than, in increasing order of preference, 100 ppm, 50 ppm, 40 ppm, 30 ppm, 20 ppm, 10 ppm, 5 ppm or less than 5 ppm with 100% oxygen enriched air. Combustion heat can also be managed through the introduction of EGR gas, as a working medium, whereby the natural tendency of a given fuel's auto-ignition temper reduction in the presence of oxygen enrichment at levels above 22% can be managed minimizing the risk of over-heat and over-speed conditions. The methods set forth above may be implemented in both purpose built high heat tolerant engines, and in conventional engines which may require improved cooling systems for controlled heat management.

In another variation, the alternative fuel includes a component selected from the group consisting of methanol, ethanol, biodiesel, hydrogen, dimethyl ether, polyoxymethylenedimethyl ether, dimethoxymethane, water, propane, iso-propane, butane, iso-butane, methane, acetalene, hydrogen, and combinations thereof. In a refinement, the alternative fuel is methanol or a combination of water, methanol, and ethanol. In some refinement, the alternative fuel is 50 to 100 volume % methanol.

In a variation, the alternative fuel includes 0 to 15 mole percent acetone, 30 to 99 mole percent methanol, 0 to 20 mole percent ethanol, 0.0 to 10 mole percent isopropanol, 0 to 1 mole percent acetic acid, 0 to 1 mole percent formic acid, 0 to 15 mole percent formaldehyde, and 1 to 30 mole percent water.

In another variation, the alternative fuel includes 1 to 12 mole percent acetone, 40 to 90 mole percent methanol, 1 to 15 mole percent ethanol, 1 to 8 mole percent isopropanol, 0.2 to 1 mole percent acetic acid, 0.2 to 1 mole percent formic acid, 1 to 12 mole percent formaldehyde, and 2 to 28 mole percent water. In a refinement, the alternative fuel includes 3 to 10 mole percent acetone, 50 to 80 mole percent methanol, 3 to 12 mole percent ethanol, 2 to 6 mole percent isopropanol, 0.2 to 1 mole percent acetic acid, 0.2 to 1 mole percent formic acid, 1 to 12 mole percent formaldehyde, and 2 to 28 mole percent water.

In another variation, the alternative fuel includes methanol in an amount from about 45 to 65 weight percent, water in an amount from about 20 to 40 weight percent, formaldehyde in an amount from about 1 to 8 weight percent, and 1,1-dimethoxy ethane in an amount from about 1 to 7 weight percent. In a refinement, the alternative fuel further includes ethanol in an amount from about 0.1 to 4 weight percent and acetone in an amount from about 0.1 to 4 weight percent. In a further refinement, the alternative fuel further includes ethyloxyactic acid in an amount from about 0.1 to 3 weight percent, methyl formate in an amount from about 0.1 to 3 weight percent, isopropyl alcohol in an amount from about 0.1 to 3 weight percent, and 1,1-dimethoxy propane in an amount from about 0.1 to 3 weight percent. In still a further refinement, the alternative fuel further includes 1-ethoxy-2-propanol in an amount from about 0.01 to 1 weight percent, 1-ethoxy-1-methoxy-ethane in an amount from about 0.01 to 1 weight percent, and 2-butanone in an amount from about 0.01 to 1 weight percent. In yet a further refinement, the alternative fuel further includes cycloserine in an amount from about 0.01 to 1 weight percent, methylal in an amount from about 0.01 to 1 weight percent, 2-methyl-1-propanol in an amount from about 0.01 to 1 weight percent, 1,1-dimethoxy-2-methyl-propane in an amount from about 0.01 to 1 weight percent, 2-methyl-2-propanol in an amount from about 0.01 to 1 weight percent, and 2-butanol in an amount from about 0.01 to 1 weight percent.

Figure 9:
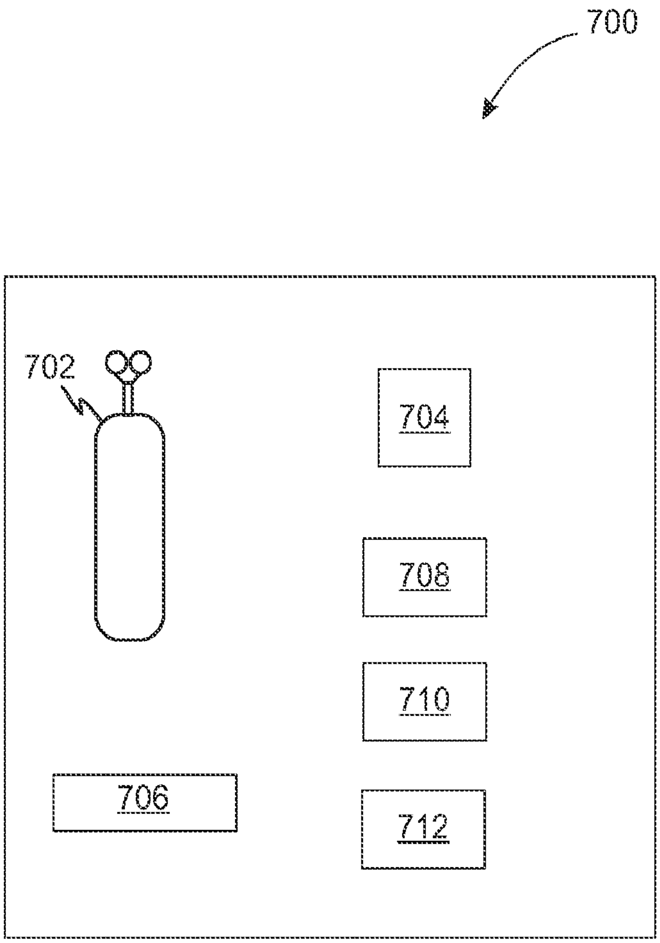
FIG. 9. Schematic illustration of a kit for upgrading a vehicle having an internal combustion engine to use an alternative fuel.

Referring to FIG. 9, a schematic of a kit for upgrading a vehicle having an internal combustion engine to use an alternative fuel is provided. The kit 700 includes an oxygen storage container 702 that provides an oxygen-containing gas having at least 22 volume percent oxygen and a fuel injection system 704 that includes a chamber for combining the oxygen-containing gas with the alternative fuel to form a combustible mixture. The fuel injection system is configured to replace or supplement a vehicle's existing OEM fuel injection system. The kit also includes a conduit 706 that is adapted to connect the fuel injection system to the internal combustion engine and an electric generator 708 adapted to be operated by the internal combustion engine to produce electricity for battery charging. The kit can also include a battery 710 for providing power to a vehicle drive train. In a refinement, kit 700 can also include one or more electric drive motors 712. During installing, a target vehicle's engine is separated from the power train and then configured to drive electric generator 708. Typically, the mechanical powertrain is removed from the target vehicle. The electric generator 708 is electrically connected to the battery for changing. The targe vehicles' fuel injection system is replaced with fuel injection system 704 and conduit 706 which is adapted to run on an alternative fuel as set forth above. In a refinement, the alternative fuel can be added to the target vehicle's existing fuel tank.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for operating an internal combustion engine, the method comprising:
- providing an oxygen-containing gas having greater than 22 volume percent oxygen;
- combining the oxygen-containing gas with an alternative fuel to form a combustible mixture; and
- directing the combustible mixture to the internal combustion engine wherein combustion of the combustible mixture drives the internal combustion engine, wherein the internal combustion engine is configured to operate for direct or indirect propulsion of an on or off road vehicle, direct or indirect propulsion of marine vessels, power generation, or industrial and agricultural pumping-pumping, wherein the alternative fuel includes 0 to 15 mole percent acetone, 30 to 99 mole percent methanol, 0 to 20 mole percent ethanol, 0.0 to 10 mole percent isopropanol, 0 to 1 mole percent acetic acid, 0 to 1 mole percent formic acid, 0 to 15 mole percent formaldehyde, and 1 to 30 mole percent water.

2. The method of claim 1 wherein the internal combustion engine operates with an otto cycle or a diesel cycle.

3. The method of claim 1 wherein the types of internal combustion engines include reciprocating, rotary or combustion turbines.

4. The method of claim 1 wherein the internal combustion engine provides enhanced compression of liquids or gases.

5. The method of claim 1 wherein a concentration of oxygen in the oxygen-containing gas is from 30 volume % to 100 volume %.

6. The method of claim 1 wherein a concentration of oxygen in the oxygen-containing gas from 50 volume % to 90 volume %.

7. The method of claim 1 further comprising oxygen-enriching ambient air to form the oxygen-containing gas.

8. The method of claim 1 wherein the oxygen-containing gas is generated onboard from ambient air.

9. The method of claim 1 wherein the alternative fuel includes a component selected from the group consisting of methanol, ethanol, biodiesel, hydrogen, dimethyl ether, polyoxymethylenedimethylether, dimethoxymethane, water and combinations thereof.

10. The method of claim 1 wherein the alternative fuel is methanol or a combination of water, methanol, and ethanol.

11. The method of claim 1 wherein the alternative fuel is 50 to 100 volume % methanol.

12. The method of claim 1 wherein the alternative fuel includes 1 to 12 mole percent acetone, 40 to 90 mole percent methanol, 1 to 15 mole percent ethanol, 1 to 8 mole percent isopropanol, 0.2 to 1 mole percent acetic acid, 0.2 to 1 mole percent formic acid, 1 to 12 mole percent formaldehyde, and 2 to 28 mole percent water.

13. The method of claim 1 wherein the alternative fuel includes 3 to 10 mole percent acetone, 50 to 80 mole percent methanol, 3 to 12 mole percent ethanol, 2 to 6 mole percent isopropanol, 0.2 to 1 mole percent acetic acid, 0.2 to 1 mole percent formic acid, 1 to 12 mole percent formaldehyde, and 2 to 28 mole percent water.

14. A kit for upgrading a vehicle having an internal combustion engine to use an alternative fuel, the kit comprising:

an oxygen source that provides an oxygen-containing gas having at least 22 volume percent oxygen;

a fuel injection system that includes a chamber for combining the oxygen-containing gas with the alternative fuel to form a combustible mixture, the fuel injection system configured to replace or supplement a vehicle's existing OEM fuel injection system;

a conduit that is adapted to connect the fuel injection system to the internal combustion engine; and a generator adapted to be operated by the internal combustion engine to produce electricity for battery charging.

15. The kit of claim 14 further comprising a battery for providing power to a vehicle drive train.

16. The kit of claim 14 further comprising electric drive motor(s) for aftermarket conversion to a hybrid drive propulsion of vehicles.

17. A method for operating an internal combustion engine, the method comprising:

providing an oxygen-containing gas having greater than 22 volume percent oxygen;

combining the oxygen-containing gas with an alternative fuel to form a combustible mixture; and directing the combustible mixture to the internal combustion engine wherein combustion of the combustible mixture drives the internal combustion engine, wherein the internal combustion engine is configured to operate for direct or indirect propulsion of an on or off road vehicle, direct or indirect propulsion of marine vessels, power generation, or industrial and agricultural pumping, wherein the alternative fuel includes methanol in an amount from about 45 to 65 weight percent, water in an amount from about 20 to 40 weight percent, formaldehyde in an amount from about 1 to 8 weight percent, and 1,1-dimethoxyethane in an amount from about 1 to 7 weight percent.

18. The method of claim 17, wherein the internal combustion engine operates with an otto cycle or a diesel cycle.

19. The method of claim 17, wherein the types of internal combustion engines include reciprocating, rotary or combustion turbines.

20. The method of claim 17, wherein the internal combustion engine provides enhanced compression of liquids or gases.

21. The method of claim 17, wherein a concentration of oxygen in the oxygen-containing gas is from 30 volume % to 100 volume %.

22. The method of claim 17, further comprising oxygen-enriching ambient air to form the oxygen-containing gas.

23. The method of claim 17, wherein the oxygen-containing gas is generated onboard from ambient air.

24. The method of claim 17, wherein the alternative fuel further includes ethyloxyactic acid in an amount from about 0.1 to 3 weight percent, methyl formate in an amount from about 0.1 to 3 weight percent, isopropyl alcohol in an amount from about 0.1 to 3 weight percent, and 1,1-dimethoxypropane in an amount from about 0.1 to 3 weight percent.

25. The method of claim 24, wherein the alternative fuel further includes 1-ethoxy-2-propanol in an amount from about 0.01 to 1 weight percent, 1-ethoxy-1-methoxy-ethane in an amount from about 0.01 to 1 weight percent, and 2-butanone in an amount from about 0.01 to 1 weight percent.

26. The method of claim 25, wherein the alternative fuel further includes cycloserine in an amount from about 0.01 to 1 weight percent, methylal in an amount from about 0.01 to 1 weight percent, 2-methyl-1-propanol in an amount from about 0.01 to 1 weight percent, 1,1-dimethoxy-2-methylpropane in an amount from about 0.01 to 1 weight percent, 2-methyl-2-propanol in an amount from about 0.01 to 1 weight percent, and 2-butanol in an amount from about 0.01 to 1 weight percent.

* * * * *